United States Patent
Payne

(10) Patent No.: US 9,196,937 B2
(45) Date of Patent: Nov. 24, 2015

(54) BATTERY MODULE AND METHOD FOR COOLING THE BATTERY MODULE

(71) Applicant: LG Chem, Ltd., Seoul (KR)

(72) Inventor: Josh Payne, Royal Oak, MI (US)

(73) Assignee: LG Chem, Ltd., Seoul (KR)

( * ) Notice: Subject to any disclaimer, the term of this patent is extended or adjusted under 35 U.S.C. 154(b) by 143 days.

(21) Appl. No.: 14/197,277

(22) Filed: Mar. 5, 2014

(65) Prior Publication Data

US 2014/0186661 A1 Jul. 3, 2014

Related U.S. Application Data

(62) Division of application No. 12/511,552, filed on Jul. 29, 2009, now Pat. No. 8,703,318.

(51) Int. Cl.

| | |
|---|---|
| *H01M 10/50* | (2006.01) |
| *H01M 6/50* | (2006.01) |
| *H01M 10/6567* | (2014.01) |
| *H01M 10/613* | (2014.01) |
| *H01M 10/60* | (2014.01) |
| *H01M 10/6568* | (2014.01) |
| *H01M 10/6551* | (2014.01) |
| *H01M 10/66* | (2014.01) |

(52) U.S. Cl.
CPC ............ *H01M 10/5075* (2013.01); *H01M 6/50* (2013.01); *H01M 6/5038* (2013.01); *H01M 10/50* (2013.01); *H01M 10/5004* (2013.01); *H01M 10/60* (2015.04); *H01M 10/613* (2015.04); *H01M 10/6551* (2015.04); *H01M 10/6567* (2015.04); *H01M 10/6568* (2015.04); *H01M 10/66* (2015.04)

(58) Field of Classification Search
CPC ............ H01M 10/5075; H01M 10/60; H01M 10/613; H01M 10/6551; H01M 10/6567; H01M 10/6568; H01M 10/66; H01M 10/50; H01M 10/5004; H01M 6/50; H01M 6/5038
See application file for complete search history.

(56) References Cited

U.S. PATENT DOCUMENTS

| | | | | | |
|---|---|---|---|---|---|
| 3,579,163 | A | * | 5/1971 | Cronin | H01F 27/02 174/17 LF |
| 5,578,393 | A | * | 11/1996 | Haskins | H01M 2/1094 429/120 |
| 6,106,972 | A | * | 8/2000 | Kokubo | H01M 2/1083 429/120 |
| 2008/0090137 | A1 | * | 4/2008 | Buck | H01M 2/1077 429/120 |

FOREIGN PATENT DOCUMENTS

JP 2009170258 A * 7/2009

* cited by examiner

*Primary Examiner* — Ula C Ruddock
*Assistant Examiner* — Scott J Chmielecki
(74) *Attorney, Agent, or Firm* — Buckert Patent & Trademark Law Firm, PC; John F. Buckert

(57) ABSTRACT

A battery module and a method for cooling the battery module are provided. The battery module includes a housing having an electrically non-conductive oil disposed therein, and a battery cell disposed in the housing that contacts the electrically non-conductive oil. The battery module further includes first and second heat conductive fins disposed in the housing that contacts the electrically non-conductive oil. The first and second heat conductive fins extract heat energy from the electrically non-conductive oil. The battery module further includes first and second conduits extending through the first and second heat conductive fins, respectively. The first and second conduits receive first and second portions of a fluid, respectively, therethrough and conduct heat energy from the first and second heat conductive fins, respectively, into the fluid to cool the battery cell.

5 Claims, 6 Drawing Sheets

BATTERY MODULE AND METHOD FOR COOLING THE BATTERY MODULE

CROSS-REFERENCE TO RELATED APPLICATIONS

This application is a divisional application of U.S. patent application Ser. No. 12/511,552 filed on Jul. 29, 2009, the entire contents of which are hereby incorporated by reference herein.

TECHNICAL FIELD

This application relates to a battery module and a method for cooling the battery module.

BACKGROUND OF THE INVENTION

In a typical air-cooled battery pack, ambient air from ambient atmosphere is directed across battery cells in the battery pack and is subsequently exhausted from the battery pack. However, the typical air-cooled battery pack has a major challenge in maintaining a temperature of the battery pack within a desired temperature range.

In particular, a maximum operating temperature of the battery cells can often be less than a temperature of ambient air utilized to cool the batteries. In this situation, it is impossible to maintain the battery cells within a desired temperature range in an air-cooled battery pack.

Accordingly, the inventors herein have recognized a need for an improved battery module and a method for cooling the battery module that minimizes and/or eliminates the above-mentioned deficiency.

SUMMARY OF THE INVENTION

A battery module in accordance with an exemplary embodiment is provided. The battery module includes a housing having an electrically non-conductive oil disposed therein. The battery module further includes a battery cell disposed in the housing that contacts the electrically non-conductive oil. The battery module further includes first and second heat conductive fins disposed in the housing that contacts the electrically non-conductive oil. The first and second heat conductive fins are configured to extract heat energy from the electrically non-conductive oil. The battery module further includes first and second conduits extending through the first and second heat conductive fins, respectively. The first and second conduits are configured to receive first and second portions of a fluid, respectively, therethrough and to conduct heat energy from the first and second heat conductive fins, respectively, into the fluid to cool the battery cell.

A method for cooling a battery module in accordance with another exemplary embodiment is provided. The battery module has a housing, a battery cell, first and second heat conductive fins, and first and second conduits extending through the first and second heat conductive fins, respectively. The method includes conducting heat energy from the battery cell into an electrically non-conductive oil disposed in the housing. The method further includes conducting heat energy from the electrically non-conductive oil into the first and second heat conductive fins disposed in the housing. The method further includes receiving first and second portions of a fluid in the first and second conduits, respectively, and conducting heat energy from the first and second heat conductive fins, respectively, into the fluid to cool the battery cell in the housing.

DETAILED DESCRIPTION OF EXEMPLARY EMBODIMENTS

Figure 1:
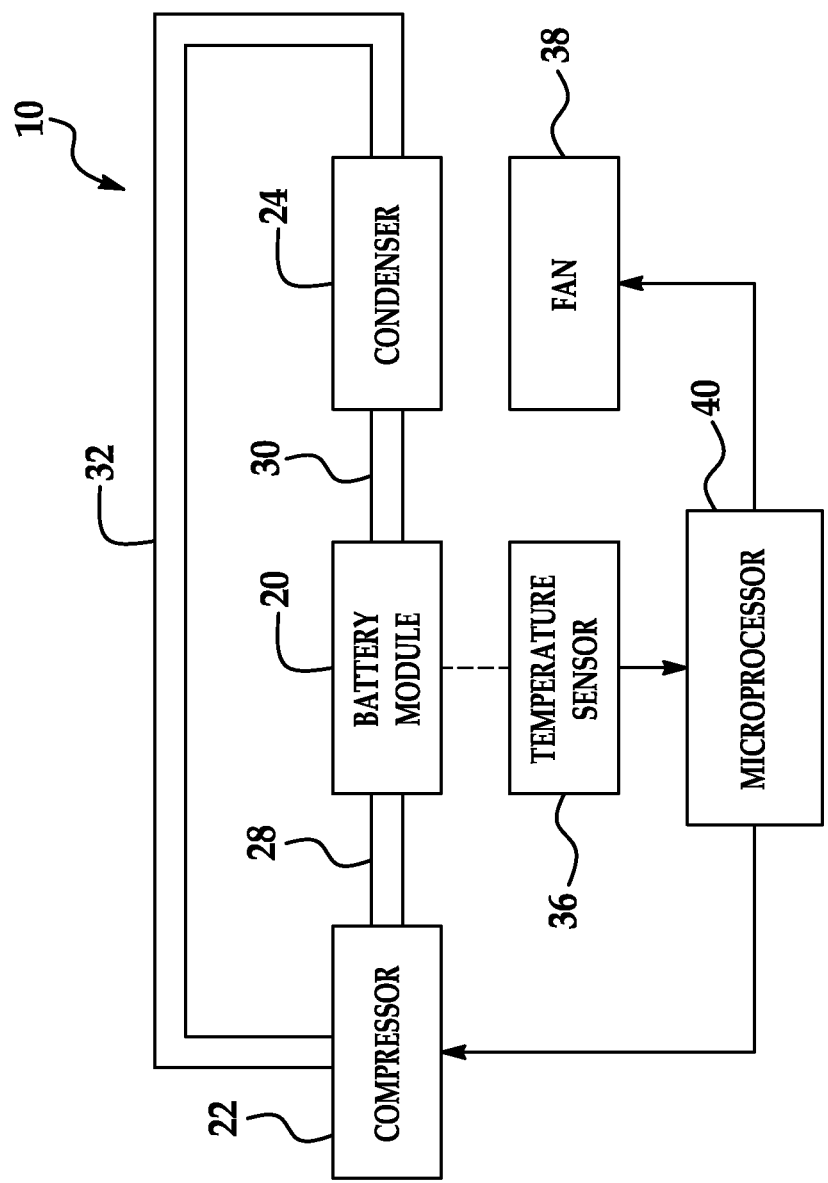
FIG. 1 is a schematic of a battery system having a battery module in accordance with an exemplary embodiment.
Figure 2:
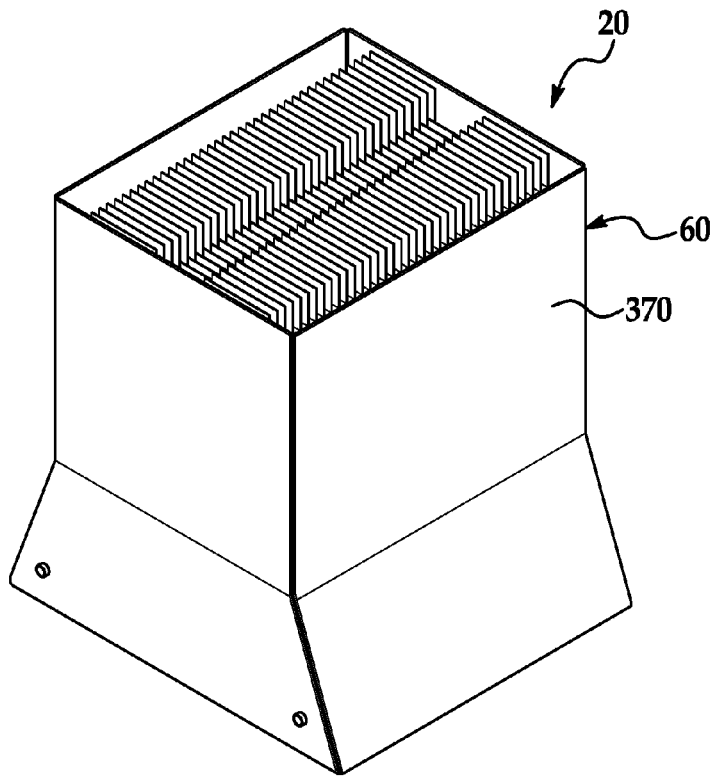
FIG. 2 is a schematic of the battery module utilized in the battery system of FIG. 1 in accordance with another exemplary embodiment.
Figure 3:
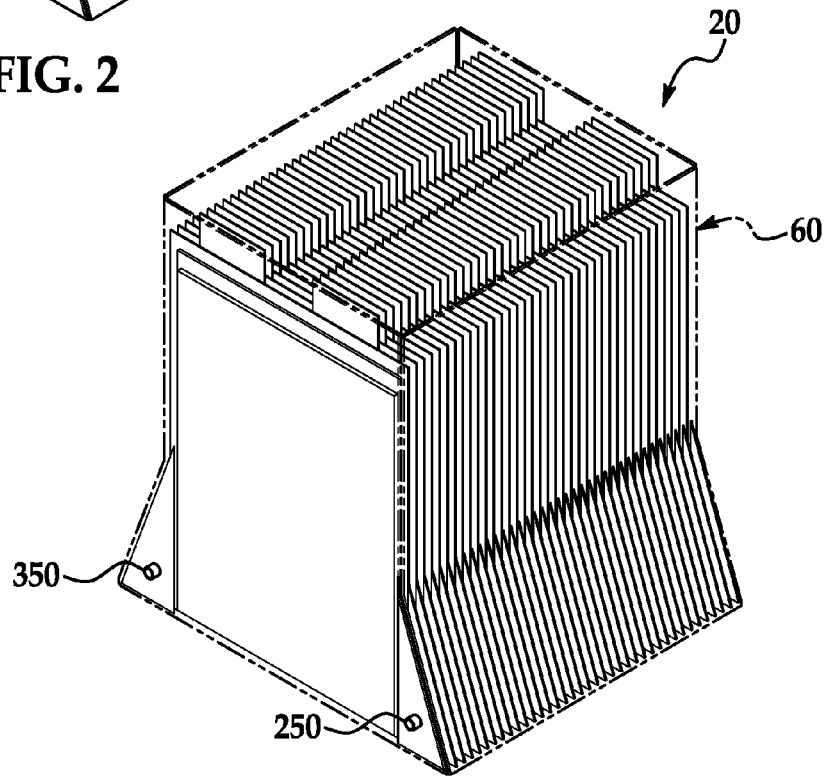
FIG. 3 is another schematic of the battery module of FIG. 2.

Referring to FIGS. 1-3, a battery system 10 for generating electrical power in accordance with an exemplary embodiment is illustrated. The battery system 10 includes a battery module 20, a compressor 22, a condenser 24, conduits 28, 30, 32, a temperature sensor 36, a fan 38, and a microprocessor 40. An advantage of the battery module 20 is that the battery module utilizes a non-conductive oil to transfer heat energy from a battery cell to at least one heat conductive fin to effectively cool the battery cell.

For purposes of understanding, the term "fluid" means either a liquid or a gas. For example, a fluid can comprise either a coolant or a refrigerant. Exemplary coolants include ethylene glycol and propylene glycol. Exemplary refrigerants include R-11, R-12, R-22, R-134A, R-407C and R-410A.

Figure 4:
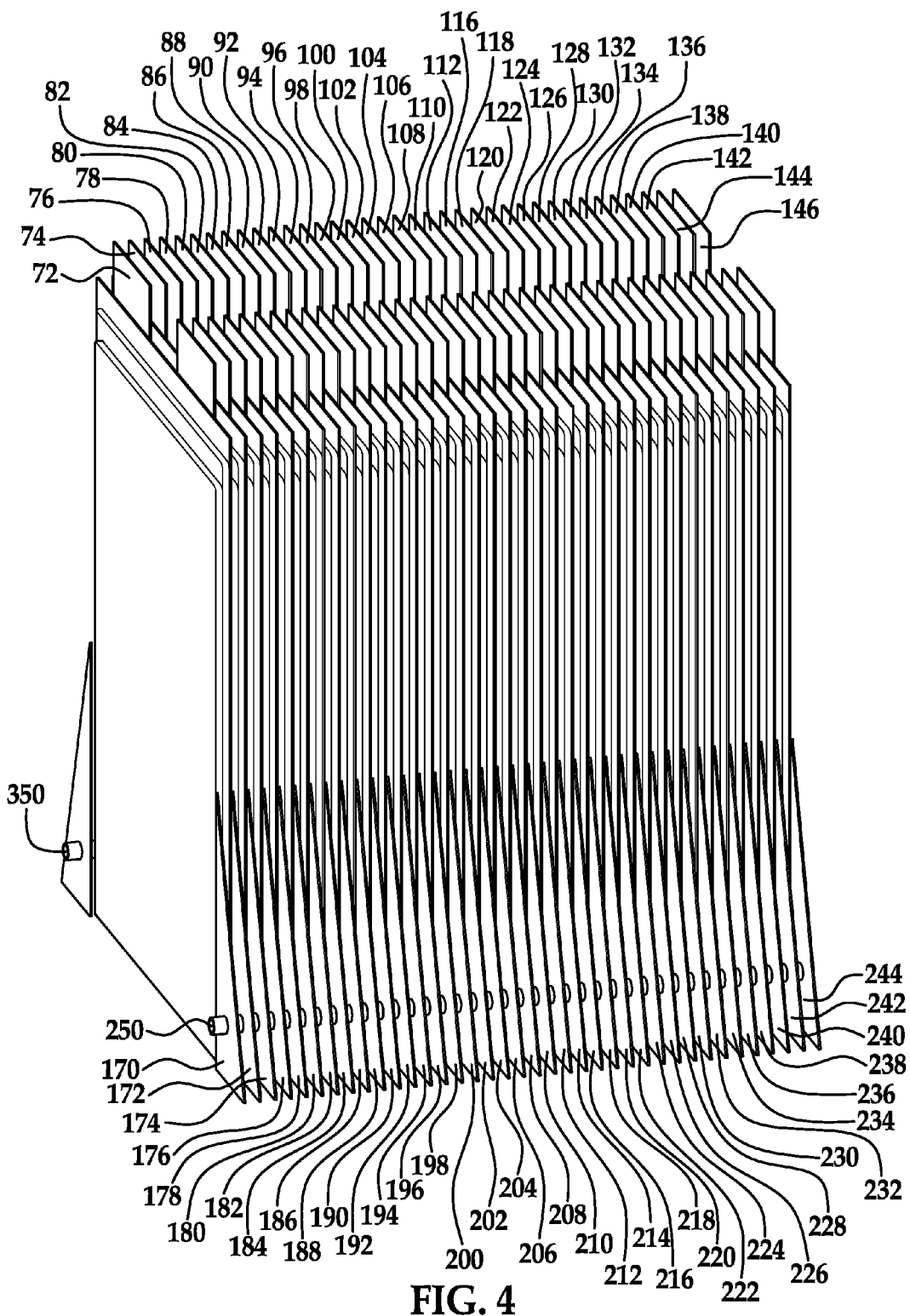
FIG. 4 is another schematic of the battery module of FIG. 2.
Figure 5:
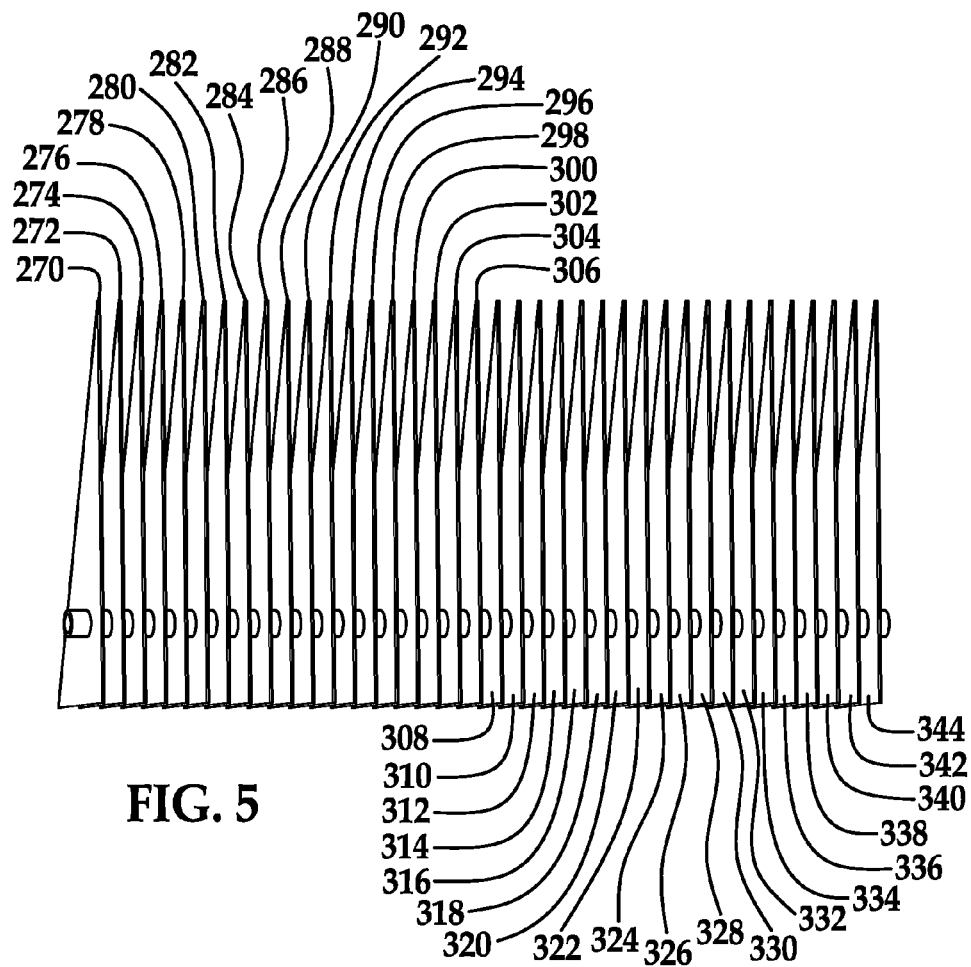
FIG. 5 is a schematic of a plurality of heat conductive fins utilized in the battery module of FIG. 2.
Figure 6:
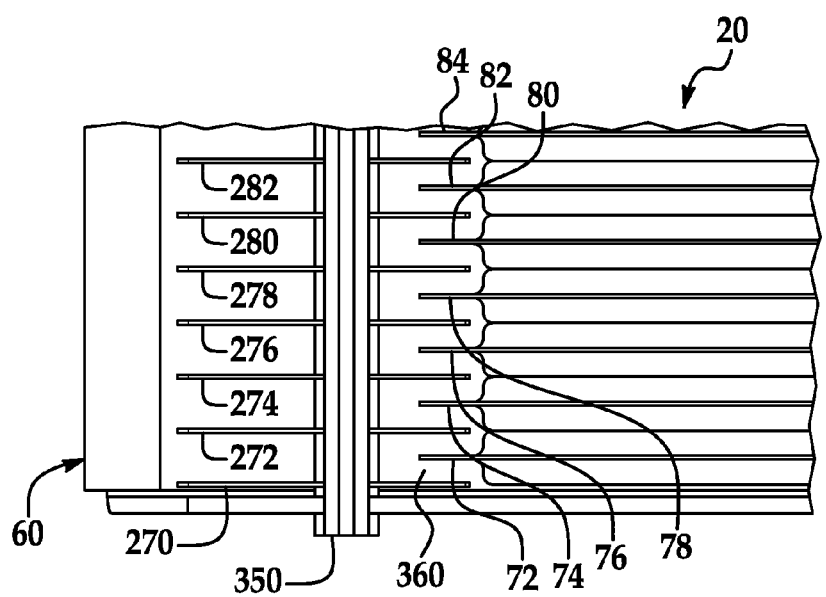
FIG. 6 is an enlarged schematic of a portion of the heat conductive fins utilized in the battery module of FIG. 2.

Referring to FIGS. 4-6, the battery module 20 is provided to generate a voltage therein. The battery module 20 includes a housing 60, battery cells 72, 74, 76, 78, 80, 82, 84, 86, 88, 90, 92, 94, 96, 98, 100, 102, 104, 106, 108, 110, 112, 114, 116, 118, 120, 122, 124, 126, 128, 130, 132, 134, 136, 138, 140, 142, 144 and 146, heat conductive fins 170, 172, 174, 176, 178, 180, 182, 184, 186, 188, 190 192, 194, 196, 198, 200, 202, 204, 206, 208, 210, 212, 214, 216, 218, 220, 222, 224, 226, 228, 230, 232, 234, 236, 238, 240, 242 and 244, conduit 250, heat conductive fins 270, 272, 274, 276, 278, 280, 282, 284, 286, 288, 290 292, 294, 296, 298, 300, 302, 304, 306, 308, 310, 312, 314, 316, 318, 320, 322, 324, 326, 328, 330, 332, 334, 336, 338, 340, 342 and 344, conduit 350, and a non-conductive fluid 360.

Referring to FIG. 2, the housing 60 includes a lower housing portion 370 and a lid (not shown) that is fixedly coupled to a top portion of the lower housing portion 370. In one exemplary embodiment, the lid is sealed to the lower housing portion 370 such that the non-conductive fluid 360 is maintained within the lower housing portion 370 without leaking therefrom. In one exemplary embodiment, the lid and the lower housing portion 370 are constructed from plastic.

Figure 7:
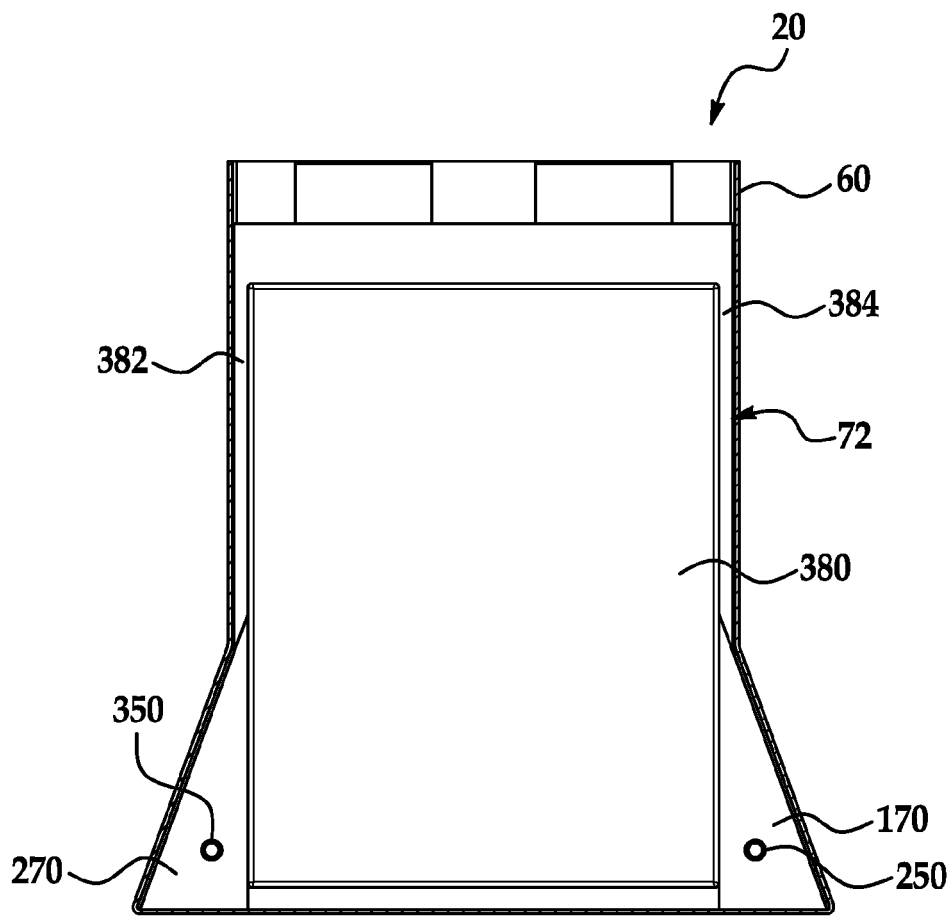
FIG. 7 is another schematic of the battery module of FIG. 2.

Referring to FIGS. 4 and 7, the battery cells 72, 74, 76, 78, 80, 82, 84, 86, 88, 90, 92, 94, 96, 98, 100, 102, 104, 106, 108, 110, 112, 114, 116, 118, 120, 122, 124, 126, 128, 130, 132, 134, 136, 138, 140, 142, 144 and 146 are provided to generate an electrical voltage. In particular, each of the battery cells has a substantially similar structure. For example, referring to battery cell 72, the battery cell includes a body portion 380, flange portions 382, 384 and a pair of electrodes extending upwardly from the body portion 380. The flange portions 382, 384 extend from first and second ends of the body portion 380. Each pair of electrodes extending from each battery cell has a voltage therebetween. The electrodes of the battery cells can be electrically coupled together either in series or in parallel depending upon a desired voltage and current of the battery module 20. The battery cells are stacked proximate to one another within the lower housing portion 370. In one exemplary embodiment, each battery cell is a lithium-ion battery cell. In alternative embodiments, the battery cells could be nickel-cadmium battery cells or nickel metal hydride battery cells for example. Of course, other types of battery cells known to those skilled in the art could be utilized.

Referring to FIGS. 4 and 6, the heat conductive fins 170, 172, 174, 176, 178, 180, 182, 184, 186, 188, 190 192, 194, 196, 198, 200, 202, 204, 206, 208, 210, 212, 214, 216, 218, 220, 222, 224, 226, 228, 230, 232, 234, 236, 238, 240, 242 and 244 are provided to conduct heat energy from the electrically non-conductive oil 360 and the battery cells into the heat conductive fins. The conduit 250 extends through apertures of the heat conductive fins 170, 172, 174, 176, 178, 180, 182, 184, 186, 188, 190 192, 194, 196, 198, 200, 202, 204, 206, 208, 210, 212, 214, 216, 218, 220, 222, 224, 226, 228, 230, 232, 234, 236, 238, 240, 242 and 244 and is brazed or welded to the heat conductive fins. Further, the heat conductive fins 170, 172, 174, 176, 178, 180, 182, 184, 186, 188, 190 192, 194, 196, 198, 200, 202, 204, 206, 208, 210, 212, 214, 216, 218, 220, 222, 224, 226, 228, 230, 232, 234, 236, 238, 240, 242 and 244 are disposed in the housing 60 proximate to first ends of the battery cells 72, 74, 76, 78, 80, 82, 84, 86, 88, 90, 92, 94, 96, 98, 100, 102, 104, 106, 108, 110, 112, 114, 116, 118, 120, 122, 124, 126, 128, 130, 132, 134, 136, 138, 140, 142, 144 and 146, respectively. The heat conductive fins are constructed from at least one of aluminum and copper. During operation, the conduit 250 is configured to receive a fluid at a first end from the compressor 22. The conduit 250 conducts heat energy from the heat conductive fins into the fluid flowing therethrough to cool the electrically non-conductive oil and the battery cells. The conduit 250 is constructed from at least one of aluminum and copper. In one exemplary embodiment, the heat conductive fins are triangular-shaped sheets. Of course, the heat conductive fins could have other shapes known to those skilled in the art. In one exemplary embodiment, the fluid is a coolant such as ethylene glycol or propylene glycol for example. In another exemplary embodiment, the fluid is a refrigerant.

Referring to FIGS. 4, 5, and 6, the heat conductive fins 270, 272, 274, 276, 278, 280, 282, 284, 286, 288, 290 292, 294, 296, 298, 300, 302, 304, 306, 308, 310, 312, 314, 316, 318, 320, 322, 324, 326, 328, 330, 332, 334, 336, 338, 340, 342 and 344 are provided to conduct heat energy from the electrically non-conductive oil 360 and the battery cells into the heat conductive fins. The conduit 350 extends through apertures of the heat conductive fins 270, 272, 274, 276, 278, 280, 282, 284, 286, 288, 290 292, 294, 296, 298, 300, 302, 304, 306, 308, 310, 312, 314, 316, 318, 320, 322, 324, 326, 328, 330, 332, 334, 336, 338, 340, 342 and 344 and is brazed or welded to the heat conductive fins. Further, the heat conductive fins 270, 272, 274, 276, 278, 280, 282, 284, 286, 288, 290 292, 294, 296, 298, 300, 302, 304, 306, 308, 310, 312, 314, 316, 318, 320, 322, 324, 326, 328, 330, 332, 334, 336, 338, 340, 342 and 344 are disposed in the housing 60 proximate to second ends of the battery cells 72, 74, 76, 78, 80, 82, 84, 86, 88, 90, 92, 94, 96, 98, 100, 102, 104, 106, 108, 110, 112, 114, 116, 118, 120, 122, 124, 126, 128, 130, 132, 134, 136, 138, 140, 142, 144 and 146, respectively. The conduit 350 is configured to receive a fluid at a first end from the compressor 22. The heat conductive fins are constructed from at least one of aluminum and copper. In one exemplary embodiment, the heat conductive fins are triangular-shaped sheets. Of course, the heat conductive fins could have other shapes known to those skilled in the art. During operation, the conduit 350 conducts heat energy from the heat conductive fins into the fluid flowing therethrough to cool the electrically non-conductive oil and the battery cells. The conduit 350 is constructed from at least one of aluminum and copper. In one exemplary embodiment, the fluid is a coolant such as ethylene glycol or propylene glycol for example. In another exemplary embodiment, the fluid is a refrigerant.

The combination of the heat conductive fins 170, 172, 174, 176, 178, 180, 182, 184, 186, 188, 190 192, 194, 196, 198, 200, 202, 204, 206, 208, 210, 212, 214, 216, 218, 220, 222, 224, 226, 228, 230, 232, 234, 236, 238, 240, 242, 244 and the conduit 250, and the combination of the heat conductive fins 270, 272, 274, 276, 278, 280, 282, 284, 286, 288, 290 292, 294, 296, 298, 300, 302, 304, 306, 308, 310, 312, 314, 316, 318, 320, 322, 324, 326, 328, 330, 332, 334, 336, 338, 340, 342, 344 and the conduit 350 can maintain the battery cells within a desired temperature range, and in particular can maintain the battery cells at a temperature less than a threshold temperature level. In one exemplary embodiment, the desired temperature range is 15° Celsius-35° Celsius. In another exemplary embodiment, the threshold temperature level is 40° Celsius.

Referring to FIG. 6, the non-conductive oil 360 is disposed in the housing 60 and contacts the battery cells to absorb heat energy from the battery cells. In one exemplary embodiment, the electrically non-conductive oil is mineral oil. Of course, other types of electrically non-conductive fluids known to those skilled in the art could be utilized instead of the electrically non-conductive oil.

Referring again to FIG. 1, the compressor 22 is configured to pump a refrigerant through the conduit 28 into the conduits 250, 350 of the battery module 20 in response to a control signal from the microprocessor 40. The conduit 30 is also fluidly coupled to the conduits 250, 350 of the battery module 20. The conduit 30 receives refrigerant from the conduits 250, 350 and routes the refrigerant to the condenser 24.

The condenser 24 is provided to extract heat energy from the refrigerant flowing therethrough to cool the refrigerant. As shown, a conduit 32 is fluidly coupled between the condenser 24 and the compressor 22. After exiting the condenser 24, the refrigerant is pumped through the conduit 32 to the compressor 22.

The temperature sensor 36 is provided to generate a signal indicative of a temperature level of the electrically non-conductive oil 360 disposed in the housing 60 that is received by the microprocessor 40. The signal from the temperature sensor 36 is further indicative of a temperature level of the battery cells.

The fan 38 is provided to urge air past the condenser 24 to cool the condenser 24 in response to a control signal from the microprocessor 40. As shown, the fan 38 is disposed proximate to the condenser 24.

The microprocessor 40 is provided to control operation of the battery system 10. In particular, the microprocessor 40 is configured to generate a control signal for inducing the compressor 22 to pump refrigerant through the battery module 20 when the signal from the temperature sensor 36 indicates a temperature level of the electrically non-conductive oil is greater than a predetermined temperature level. Further, the microprocessor 40 is configured to generate another control signal for inducing the fan 38 to blow air across the condenser 24 when the signal from the temperature sensor 36 indicates the temperature level of the electrically non-conductive oil is greater than the predetermined temperature level.

Figure 8:
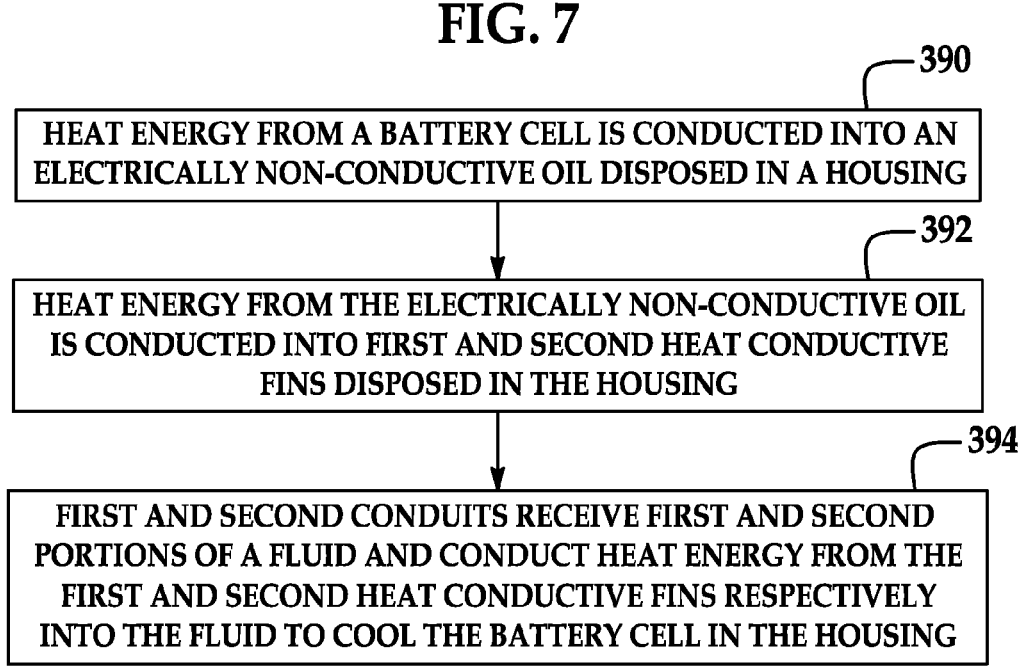
FIG. 8 is a flowchart of a method for cooling the battery module in the battery system of FIG. 1 in accordance with another exemplary embodiment.

Referring to FIG. 8, a flowchart of a method for cooling the battery module 20 having a battery cell will now be explained.

For purposes of simplicity, only one battery cell and two heat conductive fins in the battery module 20 will be described.

At step 390, the heat energy from the battery cell 72 is conducted into the electrically non-conductive oil 360 disposed in the housing 60.

At step 392, the heat energy from the electrically non-conductive oil 360 is conducted into first and second heat conductive fins 170, 270 disposed in the housing 60.

At step 394, first and second conduits 250, 350 receive first and second portions of a fluid and conduct heat energy from the first and second heat conductive fins 250, 350, respectively, into the fluid to cool the battery cell 72 in the housing 60.

Figure 9:
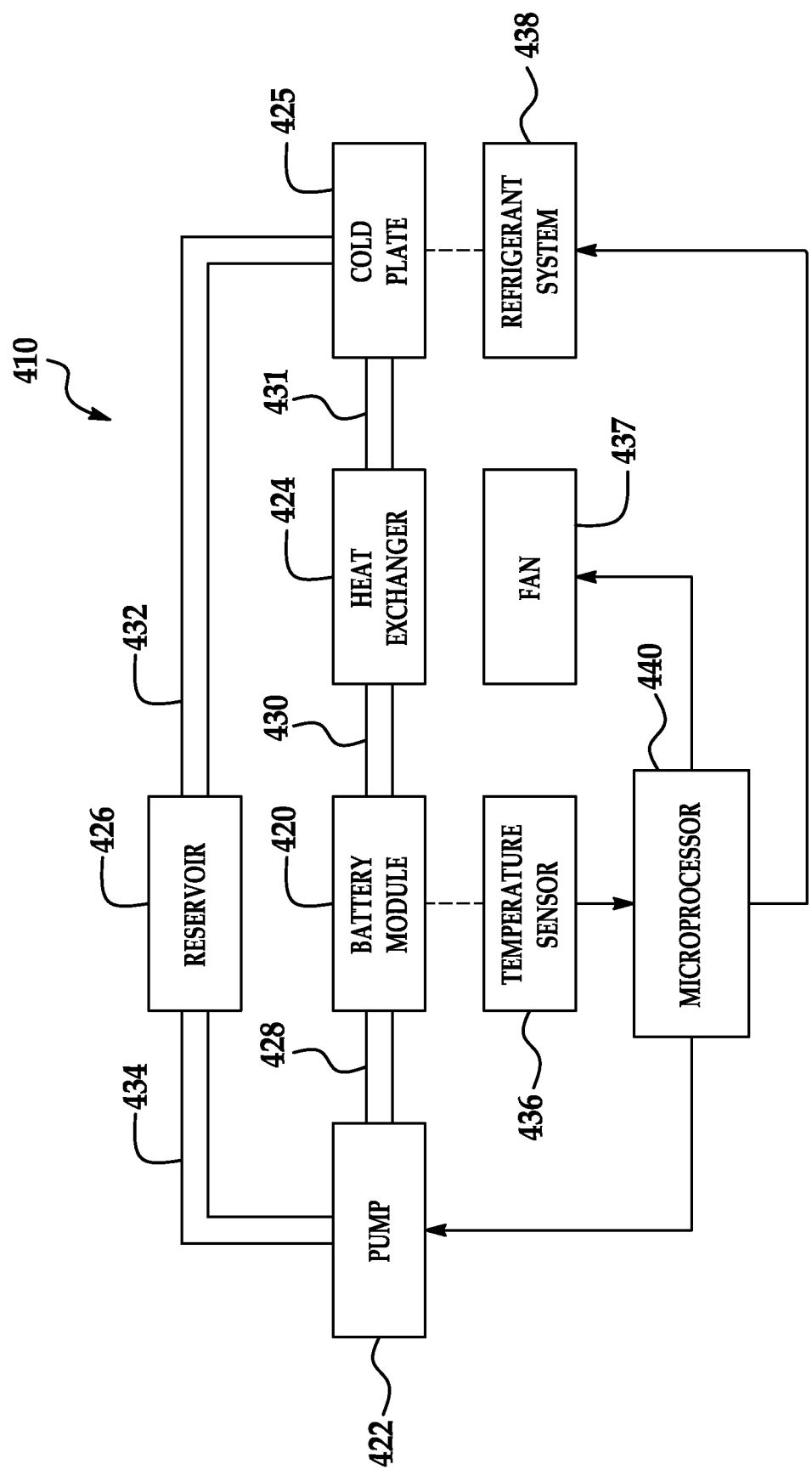
FIG. 9 is a schematic of another battery system in accordance with another exemplary embodiment.

Referring to FIG. 9, a battery system 410 for generating electrical power in accordance with another exemplary embodiment is illustrated. The battery system 410 includes a battery module 420, a pump 422, a heat exchanger 424, a cold plate 425, a reservoir 426, conduits 428, 430, 431, 432, 434, a temperature sensor 436, a fan 437, a refrigerant system 438, and a microprocessor 440. The primary difference between the battery system 410 and the battery system 10 is that the battery system 410 utilizes a coolant instead of a refrigerant to cool the battery module 420.

The battery module 420 has an identical structure as the battery module 20 discussed above.

The pump 422 is configured to pump a coolant through the conduit 428 into the battery module 420 in response to a control signal from the microprocessor 440. As shown, the conduit 428 is fluidly coupled between the pump 422 and the battery module 420, and the conduit 430 is fluidly coupled between the battery module 420 and the heat exchanger 424. After exiting the battery module 420, the coolant is pumped through the conduit 430 to the heat exchanger 424.

The heat exchanger 424 is provided to extract heat energy from the coolant flowing therethrough to cool the coolant. As shown, a conduit 431 is fluidly coupled between the heat exchanger 424 and the cold plate 425. After exiting the heat exchanger 424, the coolant is pumped through the conduit 431 to the cold plate 425.

The fan 437 is provided to urge air past the heat exchanger 424 to cool the heat exchanger 424 in response to a control signal from the microprocessor 440. As shown, the fan 437 is disposed proximate to the heat exchanger 424.

The cold plate 425 is provided to extract heat energy from the coolant flowing therethrough to further cool the coolant. As shown, a conduit 422 is fluidly coupled between the cold plate 425 and the reservoir 426. After exiting the cold plate 425, the coolant is pumped through the conduit 432 to the reservoir 426.

The reservoir 426 is provided to store at least a portion of the coolant therein. As shown, a conduit 434 is fluidly coupled between the reservoir 426 and the pump 422. After exiting the reservoir 426, the coolant is pumped through the conduit 434 to the pump 422.

The temperature sensor 436 is provided to generate a signal indicative of a temperature level of the electrically non-conductive oil, which is also indicative of the temperature level of the battery module 420, that is received by the microprocessor 440.

The refrigerant system 438 is provided to cool the heat exchanger 424 in response to a control signal from the microprocessor 440. As shown, the refrigerant system 438 is operably coupled to the cold plate 425.

The microprocessor 440 is provided to control operation of the battery system 410. In particular, the microprocessor 440 is configured to generate a control signal for inducing the pump 422 to pump refrigerant through the battery module 420 when the signal from the temperature sensor 436 indicates a temperature level of the electrically non-conductive oil is greater than a predetermined temperature level. Further, the microprocessor 440 is configured to generate another control signal for inducing the fan 437 to blow air across the heat exchanger 424 when the signal from the temperature sensor 436 indicates the temperature level of the electrically non-conductive oil is greater than the predetermined temperature level. Further, the microprocessor 440 is configured to generate another control signal for inducing the refrigerant system 438 to cool the cold plate 425 when the signal from the temperature sensor 436 indicates the temperature level of the electrically non-conductive oil is greater than the predetermined temperature level.

The battery module and the method for cooling the battery module provide a substantial advantage over other modules and methods. In particular, the battery module and the method provide a technical effect of cooling a battery cell in the battery module utilizing a non-conductive oil that contacts the battery cell in conjunction with a cooling manifold that cools the non-conductive oil.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

What is claimed is:

1. A method for cooling a battery module, the battery module having a housing, a battery cell, first and second heat conductive fins, and first and second conduits extending through the first and second heat conductive fins, respectively, the method comprising:
   conducting heat energy from the battery cell into an electrically non-conductive oil disposed in the housing;
   conducting heat energy from the electrically non-conductive oil into the first and second heat conductive fins disposed in the housing; and
   receiving first and second portions of a fluid in the first and second conduits, respectively, and conducting heat energy from the first and second heat conductive fins, respectively, into the fluid to cool the battery cell in the housing.

2. The method of claim 1, wherein the electrically non-conductive oil comprises mineral oil.

3. The method of claim 1, wherein the fluid comprises a coolant.

4. The method of claim 3, wherein the coolant comprises at least one of ethylene glycol and propylene glycol.

5. The method of claim 1, wherein the fluid comprises a refrigerant.

* * * * *